Oct. 4, 1927.                                                          1,644,423
F. J. FEARSON
LICENSE PLATE HOLDER
Filed May 25, 1926
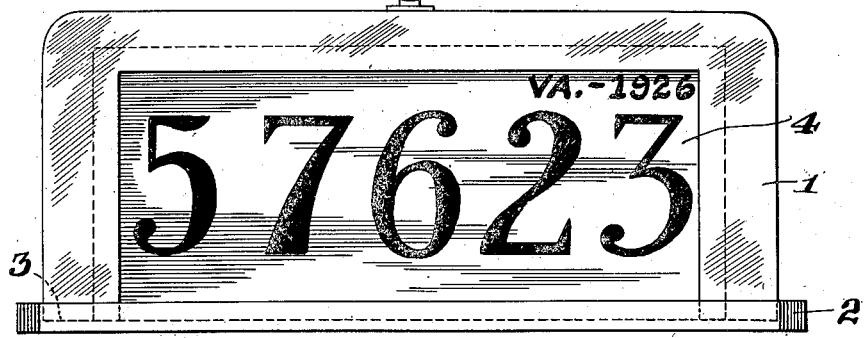
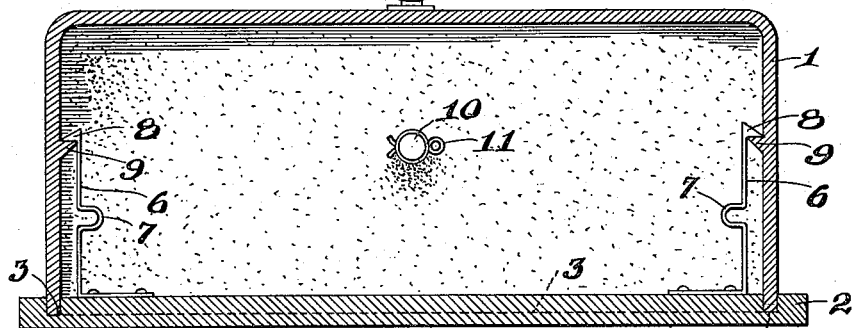
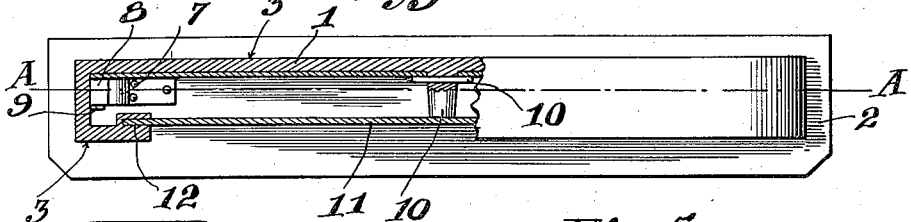
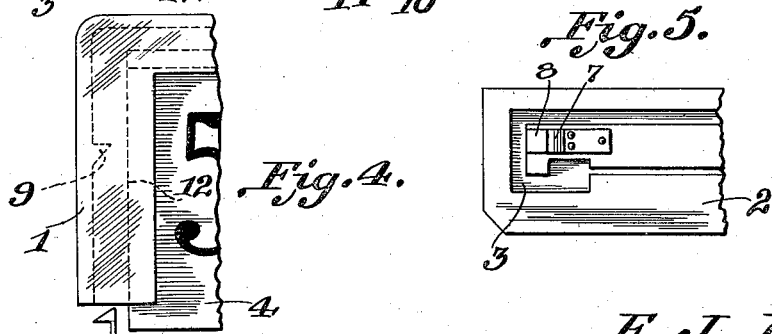
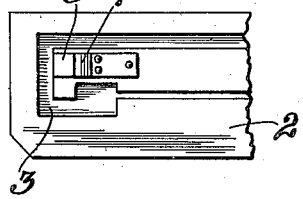
Inventor
F. J. Fearson
By Mason Fenwick Lawrence
Attorneys Patented Oct. 4, 1927.

1,644,423

UNITED STATES PATENT OFFICE.

FRANCIS JOSEPH FEARSON, OF BALTIMORE, MARYLAND.

LICENSE-PLATE HOLDER.

Application filed May 25, 1926. Serial No. 111,581.

This invention relates to improvements in license plate holders.

The object of this invention is to prevent the use of tags after the true owner is through with them, and necessitate the mutilating or destroying of same in order to remove the tags from the car.

It is common knowledge that a great many of our crimes go unpunished because unscrupulous persons get hold of what are known as "dead tags" and use the same in committing their crimes. It is believed that by forcing everyone to multilate his tags when they are removed from the car, this source of crime would be eliminated.

The chief novelty lies in the locking means employed to prevent the license plate from being removed from the holder.

Other novelty lies in the superior and simple construction.

Still other novelty will be shown in the specification and drawings attached.

Referring to the drawings:

Figure 1 is a front elevation of the holder with the license plate in place.

Figure 2 is a horizontal, perpendicular section taken along the lines 2—2 of Figure 3.

Figure 3 is a perspective view looking down with a section of the top removed.

Figure 4 is an elevation showing one end of the holder with the license plate partly inserted in the holder, the holder suspended above the locking means and base.

Figure 5 is a top plan of one end of the holder with the top removed.

In the drawings, like numerals designate similar parts. Numeral 1 represents the top portion of a license tag holder, 2 a base having a groove 3 in which the top portion 1 rests. 4 represents a license plate or tag, and 5 a light mounted on the top portion 1. Supported by a base 2 is a spring locking member 6 with a bowed portion 7. At the end of locking member 6 is a dog 8 capable of engaging a lug 9 mounted on the inside of the top portion 1. On the back wall of top portion 1 is a knob 10 with a cotter pin or other fastening means 11 used to hold a sheet of asbestos or other non-inflammable material in position. A portion of the front of the top portion 1 is removed, so that the license plate 4 may be placed therein, the edges of the section from which the front portion is removed having a groove 12 in which the license tag 4 may operate.

As operated, license tag 4 is first slid in the groove 12 from the bottom until the bottom of the license plate comes flush with the bottom of the top portion. The top portion of the holder, including the license plate, is then placed over locking member 6 so that it comes to rest in groove 3 in base 2. The groove 3 thus prevents the license plate from being removed from the holder.

The groove 3 is wide enough and deep enough to receive the top portion and make it practically impossible to get beneath the edge of the top portion 1 with any sort of tool. As the top portion slides over the locking members 6, the dog 8 will be forced inwardly by lug 9. When the top portion 1 has come to rest in the groove 3, the dog 8 will spring over the lug 9 and lock the top portion 1 securely to the base 2.

It will now be impossible to unlock the holder without destroying the license plate. The normal procedure will be, when license plates are desired to be changed, to take an acetylene torch or similar tool and burn away a sufficient amount of the license plate to allow one to reach the bowed portion of the locking members and pull them inwardly so that the top portion may be removed from the base. The mutilated tags may then be removed and fresh tags placed therein. The removed tags cannot be used again and will practically eliminate the use of "dead tags".

By making the holder of malleable iron and of sufficient thickness to resist all ordinary attempts of theft, it will be practically impossible to break into same without destroying or mutilating the license plate to such an extent that no one could use it again.

Having described my invention, what I claim as new and novel is:

1. A license plate holder comprising a casing having an open end and front, an identification plate slidably inserted in said front to close the latter, a member closing said end, and cooperating locking means on opposite ends of said member and on the inside of each side of said casing to lock said plate and member to said casing.

2. A boxlike casing having part of one side thereof cut away to form a recess, said recess having grooves in the edges thereof, an identification plate slidably mounted in the grooves of said recess, a closure member for said casing, cooperative locking means on the opposite ends of said closure member and the inside of each side of said casing to lock said member, plate and casing together.

3. A license plate holder comprising a casing formed as a box having its top integral with its ends and one side, an identification plate slidably connected to said ends and forming the remaining side of said casing, a bottom recessed to fit snugly over the said side and ends of said box to engage said plate and prevent movement thereof, cooperating locking means on opposite sides of said bottom and on the inside of the said ends to lock the casing, bottom and plate together.

4. A license plate holder as set forth in claim 3, in which each of said cooperating means comprises a leaf spring fixed at one end to said bottom and having a lug projecting from the free end thereof, and a projection fixed to the inside of the adjacent end of said casing and adapted to engage said lug when the bottom is forced into closing engagement with the ends and side of said casing and identification plate.

5. A license plate holder comprising a box, an identification plate forming one side thereof, and slidably connected to the remainder of the box, a closure member, means on opposite ends of said member and on the inside of the ends of said box to lock the member, box and plate together.

6. A license plate holder as set forth in claim 5 in which said member is grooved to seat snugly over the ends of said box and plate.

In testimony whereof I affix my signature.

FRANCIS JOSEPH FEARSON.